(12) United States Patent
McDonald et al.

(10) Patent No.: US 8,067,924 B2
(45) Date of Patent: Nov. 29, 2011

(54) PHASE SHEDDING CONVERTER WITH RIPPLE MINIMIZATION

(75) Inventors: Brent A. McDonald, Round Rock, TX (US); George G. Richards, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/165,922

(22) Filed: Jun. 22, 2011

(65) Prior Publication Data

US 2011/0248689 A1   Oct. 13, 2011

Related U.S. Application Data

(63) Continuation of application No. 11/953,985, filed on Dec. 11, 2007, now Pat. No. 7,999,519.

(51) Int. Cl.
*G05F 1/00* (2006.01)
(52) U.S. Cl. .................................................. 323/238
(58) Field of Classification Search .................. 323/222, 323/237, 238, 272, 282, 284, 299
See application file for complete search history.

(56) References Cited

U.S. PATENT DOCUMENTS

| | | | |
|---|---|---|---|
| 6,495,995 B2 * | 12/2002 | Groom et al. | 323/283 |
| 6,580,623 B1 * | 6/2003 | Williams et al. | 363/78 |
| 6,674,274 B2 | 1/2004 | Hobrecht et al. | |
| 6,995,548 B2 * | 2/2006 | Walters et al. | 323/272 |
| 7,078,885 B2 * | 7/2006 | Prexl | 323/277 |
| 7,265,522 B2 * | 9/2007 | Sutardja et al. | 323/222 |
| 7,663,266 B2 * | 2/2010 | Gentillet et al. | 307/65 |
| 2007/0262756 A1 * | 11/2007 | Valley et al. | 323/234 |

* cited by examiner

*Primary Examiner* — Adolf Berhane
*Assistant Examiner* — Yemane Mehari
(74) *Attorney, Agent, or Firm* — Haynes and Boone, LLP

(57) ABSTRACT

In an information handling system, a multi-phase electrical converter includes an electrical input, an electrical output, a plurality of converter phases coupled with the electrical input and the electrical output, and a controller to ramp operation of one or more of the converter phases as a load demand adjusts. In an embodiment the converter may be a multi-phase buck converter having a high side switch, a low side switch, and an inductor. In an embodiment, the controller may ramp operation of the converter phases by adjusting a duty cycle of the high side switch. In an embodiment, the controller may adjust a phase angle of one or more of the converter phases, wherein the adjustment may be relative to the ramping operation of the one or more of the converter phases.

14 Claims, 5 Drawing Sheets

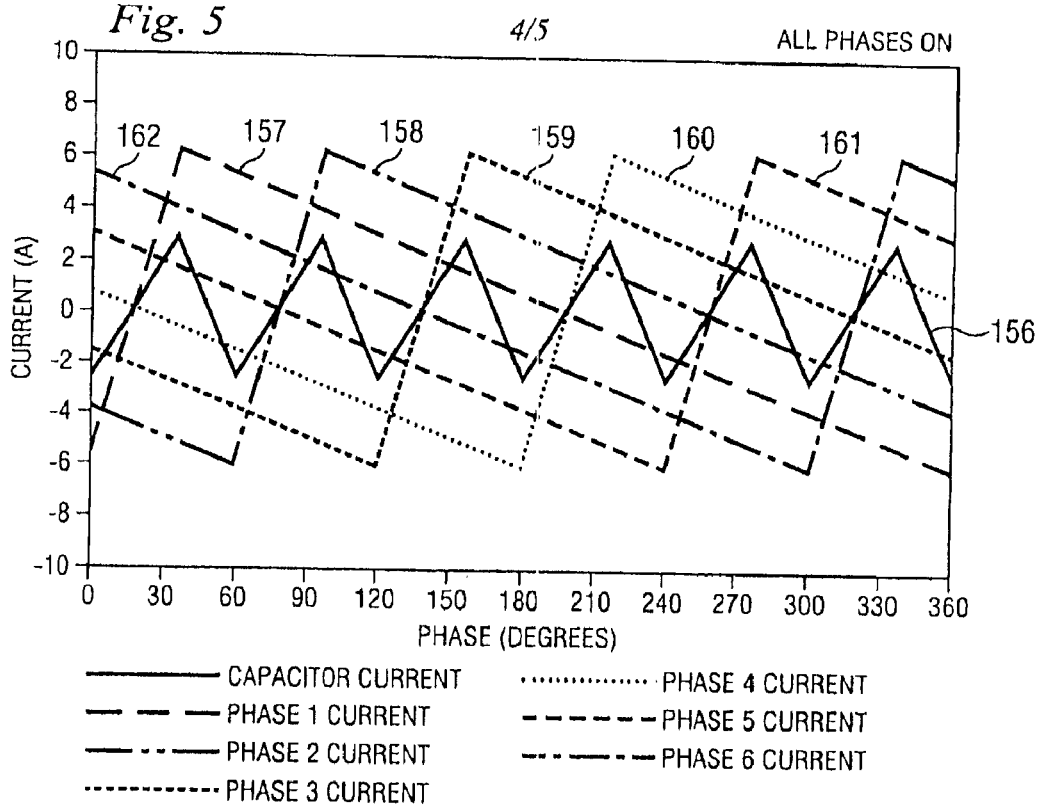
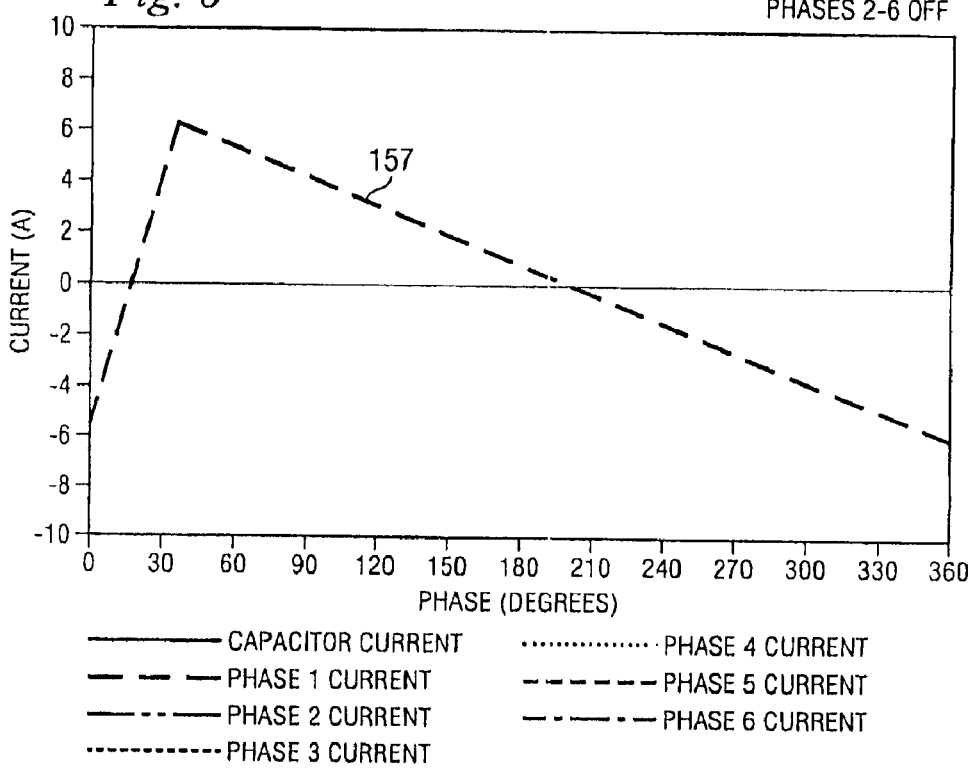

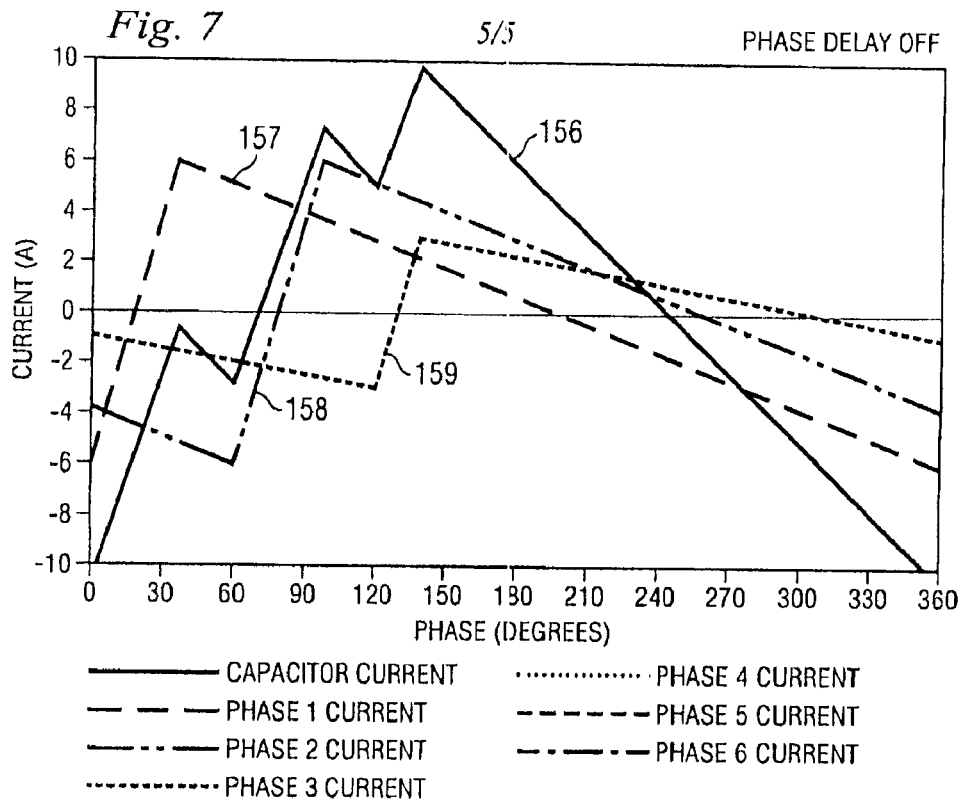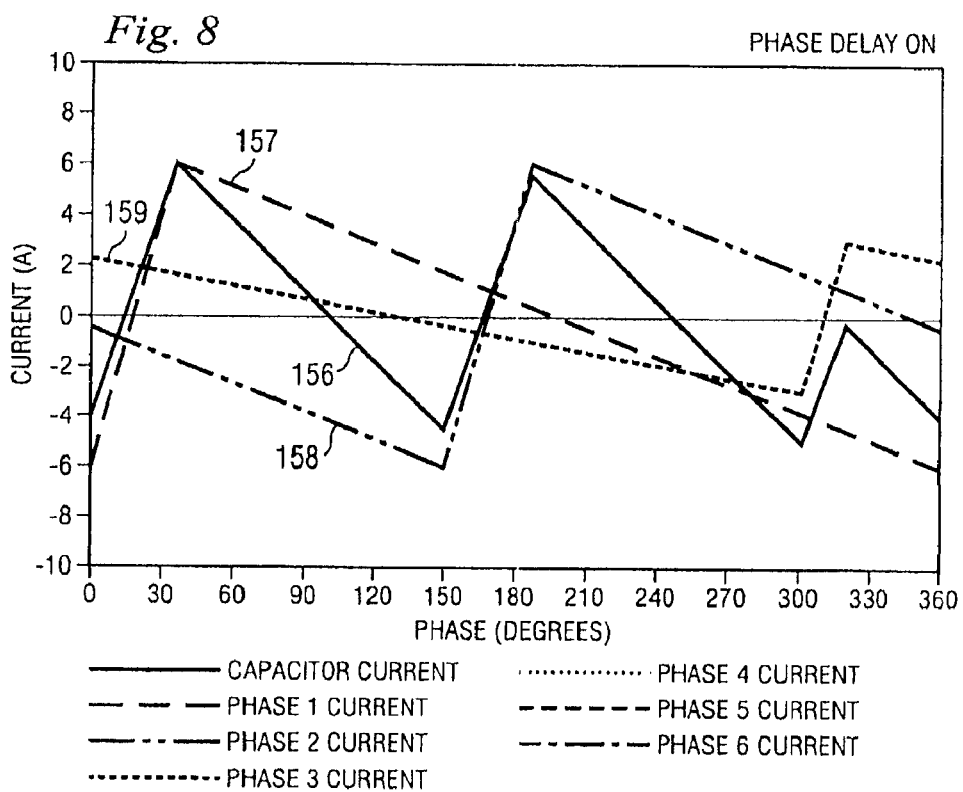

PHASE SHEDDING CONVERTER WITH RIPPLE MINIMIZATION

CROSS REFERENCE TO RELATED APPLICATION

The present application claims priority to and is a continuation of co-owned, co-pending U.S. patent application Ser. No. 11/953,985 filed Dec. 11, 2007, the disclosure of which is incorporated herein by reference.

BACKGROUND

The present disclosure relates generally to information handling systems, and more particularly to a phase shedding converter system having reduced output ripple.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Changing power demands of electronics (e.g., IHS motherboards) can vary by an order of magnitude. Electronic converters may provide power to the electronics and are designed to provide such a large fluctuation in power consumption. It is well known in the art that a converter/regulator such as, a buck converter, has an increased efficiency with an increased number of phases in operation converting the power for consumption. As the phase count increases, a heavy load efficiency improves, but a light load efficiency degrades. To overcome this problem, the industry is moving toward phase shedding of the extra phases in periods of lower demand for power. Phase shedding improves the efficiency of the converter system by operating only the number of phases necessary for a given load demand. However, a problem is how to turn the phases off and on without creating excessive and possibly damaging ripple voltage at the converter output. Simply turning off or dropping a phase or multiple phases in the converter during a load may cause excessive ripple output that may damage the load (e.g., a processor). One solution is to add extra capacitance at the output to filter the output ripple. However, extra capacitors can be costly and also can be physically large and take up valuable space in the electronics.

Accordingly, it would be desirable to provide an improved phase shedding converter with ripple minimization which avoids the problems set forth above.

SUMMARY

According to one embodiment, a multi-phase electrical converter includes an electrical input, an electrical output, a plurality of converter phases coupled with the electrical input and the electrical output, and a controller to ramp operation of one or more of the converter phases as a load demand adjusts.

BRIEF DESCRIPTION OF THE DRAWINGS

FIG. 5 illustrates a current chart for an embodiment of a converter having all phases on.

FIG. 6 illustrates a current chart for an embodiment of a converter only showing current for one phase of the converter.

FIG. 7 illustrates a current chart for an embodiment of a converter where a phase delay is turned off.

FIG. 8 illustrates a current chart for an embodiment of a converter where a phase delay is turned on.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
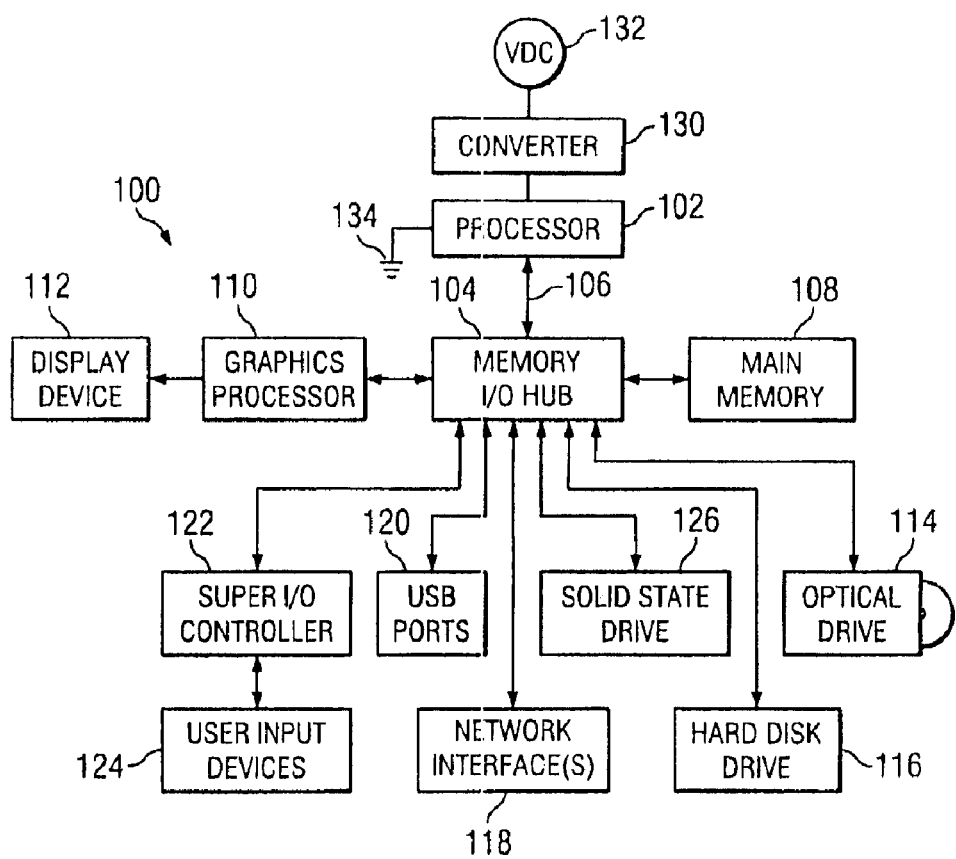
FIG. 1 illustrates a block diagram of an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

In an embodiment, the IHS 100 may include a converter 130, such as a buck converter or other type of converter, to regulate power to the processor 102. The converter may receive electrical power from a power source 132 and convert the power to a different voltage level such as, receiving 12 vdc and converting that to 1-1.2 vdc for use by the processor 102. The processor 102 may additionally be coupled with an electrical ground 134.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
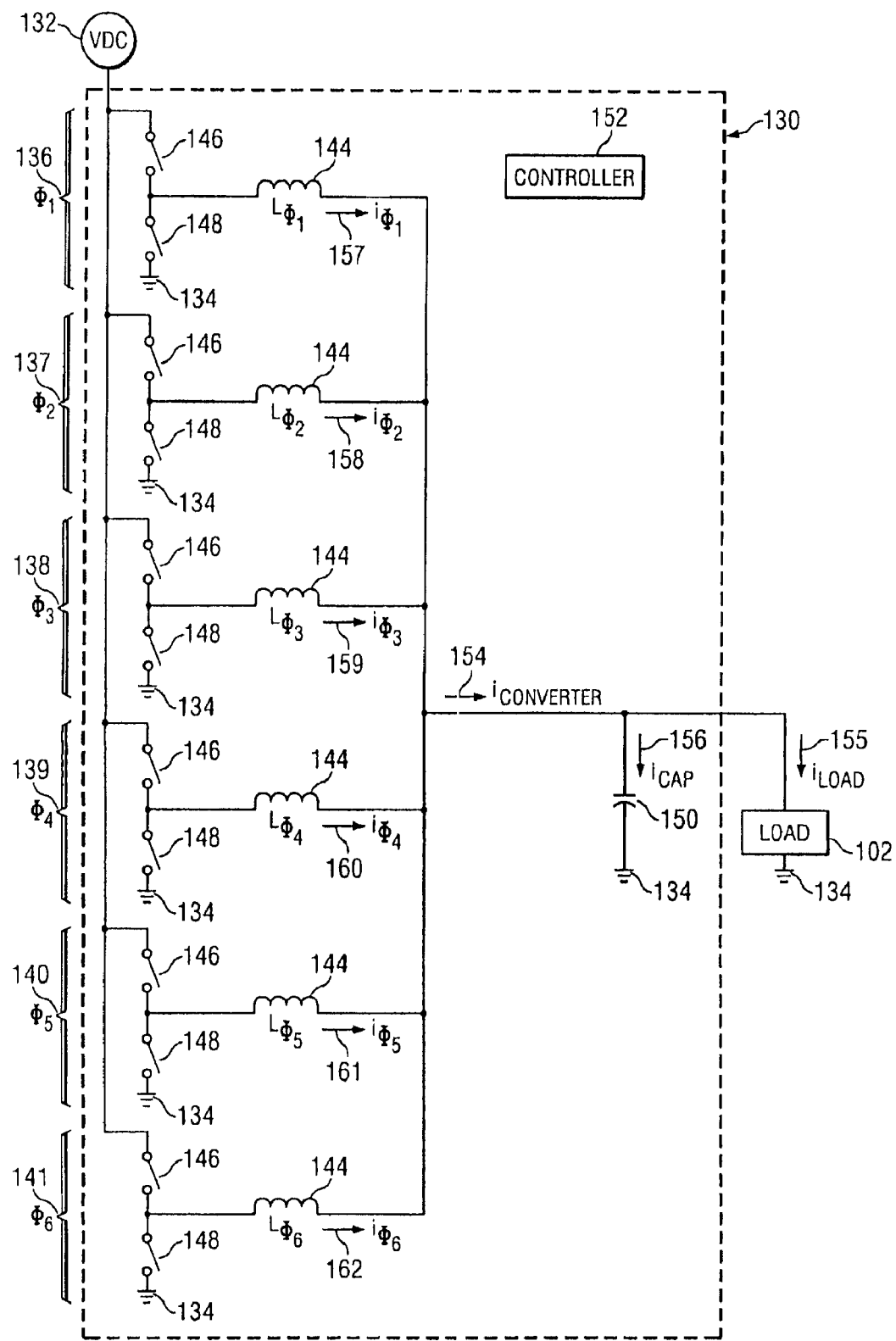
FIG. 2 illustrates a schematic of an embodiment of a converter to minimize output ripple.

FIG. 2 illustrates a schematic diagram of an embodiment of a converter 130 to minimize output ripple. In an embodiment, the converter 130 may be a buck converter. However, other types of converters may be used. Also, the converter 130 may be either synchronous, or asynchronous. The converter 130 has a plurality phase circuits (herein called phases for simplicity) 136, 137, 138, 139, 140, and 141 coupled together so that the converter 130 may operate at multiple phases to reduce output ripple. Having six phases, as shown, allows the converter 130 to operate every 60 degrees throughout a radial scale. Thus, phase 1 is 60 degrees from phase 2, phase 2 is 60 degrees from phase 3, and so on. It should be readily understood by those having ordinary skill in the art that any number of phases may be utilized in the converter 130.

In an embodiment, each of the phases 136, 137, 138, 139, 140, and 141 includes an inductor 144, a high side switch 146, and a low side switch 148. The high side switch 146 and the low side switch 148 may be electronic switches such as, transistors (e.g., a metal oxide semiconductor field effect transistor (MOSFET), a bipolar junction transistor (BJT), or another type of switch device. In addition, the low side switch 134 may be a diode. An embodiment of the converter 130 has a controller 152 operable to turn on and off the high side switch 146 and the low side switch 148 in sequence to charge the inductor 144 from the power source 132 through the high side switch 146 when it is closed and to discharge the inductor 144 through the low side switch 148 to ground 134 when it is closed. The controller 152 is controllably coupled with the high side and low side switches 146 and 148, but is not shown coupled in FIG. 2 for simplicity of the figure. Generally, the high side switch 146 and the low side switch 148 should not both be closed concurrently, but there may be times where this is performed. The output of the inductors 144 is filtered with a capacitor 150 to ground 134. A converter output current 154 is a sum of individual currents 157, 158, 159, 160, 161, and 162 passing through the inductors 144 of the operating inductors phases 136, 137, 138, 139, 140, and/or 141. The output current 154 is separated into a load current 155 (e.g., a dc component of the converter output current 154) that passes through the load 102 and a capacitor current 156 (e.g., an ac component of the converter output current 154) that passes through the capacitor 150.

Figure 3:
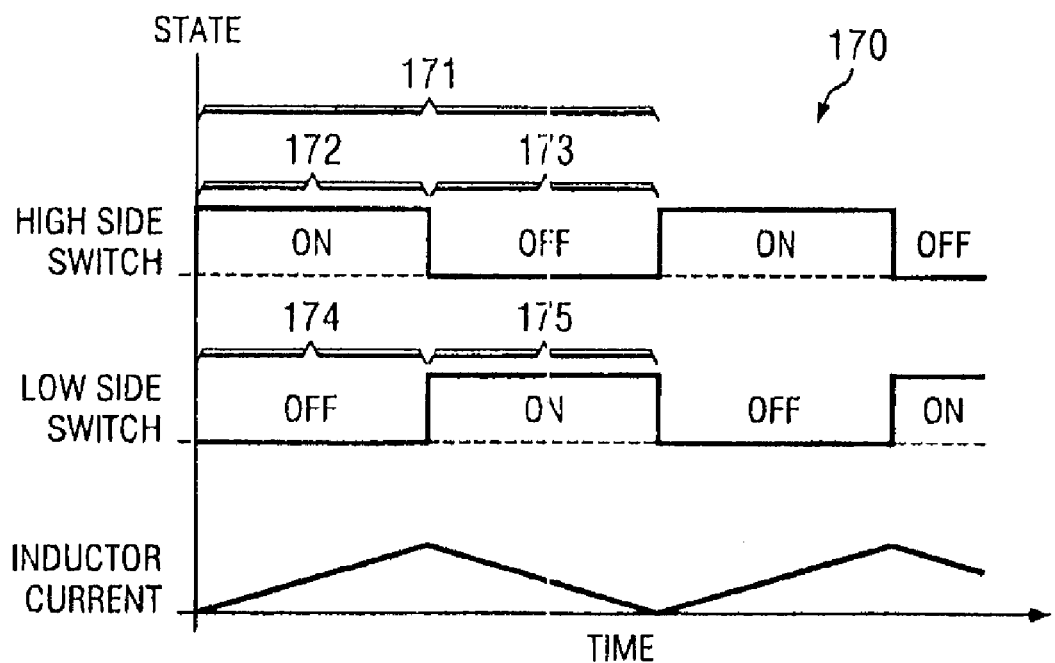
FIG. 3 illustrates a chart of a converter time vs. switch state for a phase of an embodiment of a converter to minimize output ripple.

FIG. 3 illustrates an embodiment of a time/switch state chart 170. This chart 170 shows an inductor current 157, 158, 159, 160, 161, or 162 for one phase 136, 137, 138, 139, 140, or 141 relative to the operation of the high side switch 146 and the low side switch 148 for the phase 136, 137, 138, 139, 140, or 141. The chart 170 shows a full period or cycle 171 for the phase 136, 137, 138, 139, 140, or 141 operation. The high side switch 146 is on at 172 and off at 173, while the low side switch 148 is off at 174 and on at 175. As is commonly understood, the duty cycle is a ratio of on time to off time (e.g., duty cycle=Ton/(Ton+Toff)). Thus, in FIG. 3, the duty cycles for the high side switch 146 and the low side switch are approximately equal.

Figure 4:
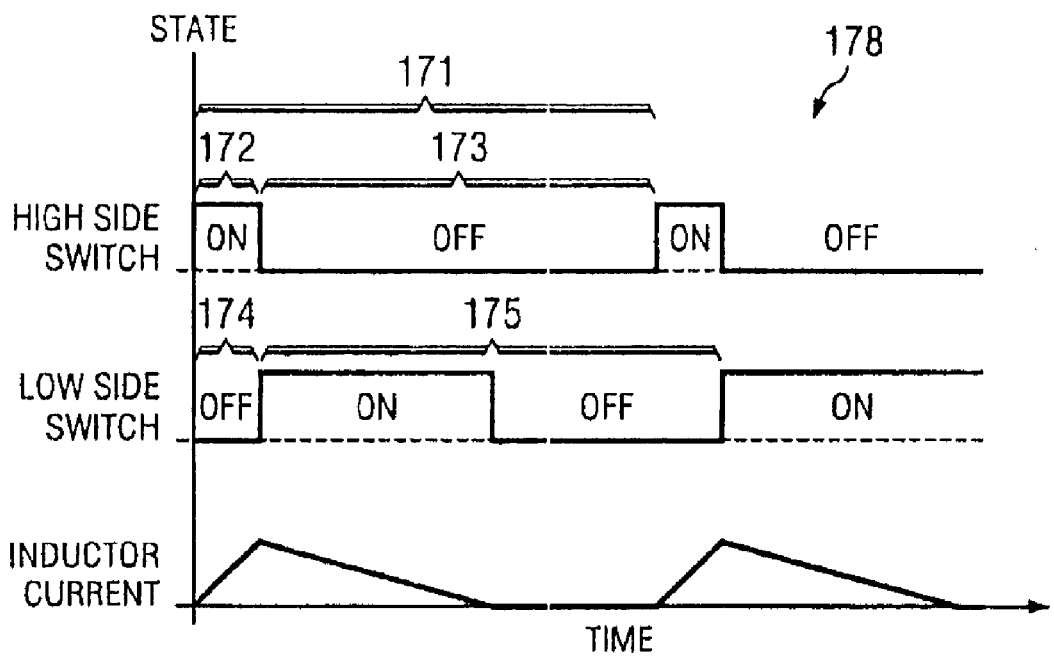
FIG. 4 illustrates a chart of a converter time vs. switch state for a phase of an embodiment of a converter to minimize output ripple where the high side switch on time is reduced.

FIG. 4 illustrates an embodiment of a converter time/state chart 178. In this embodiment, the duty cycle for the high side switch 148 is decreased over time as the output demand decreases, thereby ramping operation of the converter 130. Therefore, when there is an ability to reduce output power for the converter 130, the controller may modify the duty cycle over time until the duty cycle for the high side switch 148 is approximately zero, therein softly turning off the shed phase 137, 138, 139, 140, and/or 141 (e.g., a soft stop). As the phase 137, 138, 139, 140, and/or 141 is turned off, the converter 130 may also adjust the phase angles of the remaining phases 136, 137, 138, 139, 140, and/or 141 to adjust for the turned off phase 137, 138, 139, 140, and/or 141 so that a substantially balanced output may be supplied to the load 102. Similarly, as the load demand increases, the converter 130, via a controller, may softly turn on any shed phases by increasing the on duty cycle over time to the high side switch 146 until a desired level is reached. Additionally, when turning on the shed phase, the converter 130, via a controller 152, may adjust the phase angles for the operating phases to account for the added phase output.

FIGS. 5-8 illustrate embodiments of current charts for currents at different phase angles. FIG. 5 illustrates a current chart for an embodiment of a converter having all phases on. FIG. 6 illustrates a current chart for an embodiment of a converter only showing current for one phase of the converter. FIG. 7 illustrates a current chart for an embodiment of a converter where a phase delay is turned off. FIG. 8 illustrates a current chart for an embodiment of a converter where a phase delay is turned on.

In an embodiment, operating conditions, duty cycle definitions, ripple current definition, general inductor current definition, modified $\phi_d$ to account for 2 to 1 phase shedding of 1 to 2 phase adding, inductor currents, capacitor ripple currents, and phase variable for animation for the charts are as follows:

$$V_{out} := 1.2 \cdot V \quad V_{in} := 12 \cdot V \quad L_\phi := 0.3 \cdot \mu H \quad D := \frac{V_{out}}{V_{in}}$$

$$f_s := 300 \text{ kHz} \quad D := 10\% \quad N_\phi := 6 \quad t := 0 \cdot s, 1 \cdot ns \ldots \frac{1}{f_s}$$

Duty Cycle Defintions $\phi_d$ is a phase shift term used to control the rate at which duty cycle is reduced for the phase being added or shed.

$$D_{\phi 6}(\phi_d) := \begin{vmatrix} \frac{V_{out}}{V_{in}} \cdot \left[ 1 - \frac{\phi_d}{360 \cdot \text{deg} \cdot \left( \frac{1}{5} - \frac{1}{6} \right)} \right] & \text{if } 0 \le \phi_d \le 360 \cdot \text{deg} \cdot \left( \frac{1}{5} - \frac{1}{6} \right) \\ 0 & \text{otherwise} \end{vmatrix}$$

$$D_{\phi5}(\phi_d) := \begin{vmatrix} \dfrac{V_{out}}{V_{in}} & \text{if } 0 \leq \phi_d \leq 360 \cdot \deg \cdot \left(\dfrac{1}{5} - \dfrac{1}{6}\right) \\[2ex] \dfrac{V_{out}}{V_{in}} \cdot \left[1 - \dfrac{\phi_d - 360 \cdot \deg \cdot \left(\dfrac{1}{5} - \dfrac{1}{6}\right)}{360 \cdot \deg \cdot \left(\dfrac{1}{4} - \dfrac{1}{5}\right)}\right] & \text{if } 360 \cdot \deg \cdot \left(\dfrac{1}{5} - \dfrac{1}{6}\right) < \\[2ex] & \phi_d \leq 360 \cdot \deg \cdot \left(\dfrac{1}{4} - \dfrac{1}{6}\right) \\[2ex] 0 & \text{otherwise} \end{vmatrix}$$

$$D_{\phi4}(\phi_d) := \begin{vmatrix} \dfrac{V_{out}}{V_{in}} & \text{if } 0 \leq \phi_d \leq 360 \cdot \deg \cdot \left(\dfrac{1}{4} - \dfrac{1}{6}\right) \\[2ex] \dfrac{V_{out}}{V_{in}} \cdot \left[1 - \dfrac{\phi_d - 360 \cdot \deg \cdot \left(\dfrac{1}{4} - \dfrac{1}{6}\right)}{360 \cdot \deg \cdot \left(\dfrac{1}{3} - \dfrac{1}{4}\right)}\right] & \text{if } 360 \cdot \deg \cdot \left(\dfrac{1}{4} - \dfrac{1}{6}\right) < \\[2ex] & \phi_d \leq 360 \cdot \deg \cdot \left(\dfrac{1}{3} - \dfrac{1}{6}\right) \\[2ex] 0 & \text{otherwise} \end{vmatrix}$$

$$D_{\phi3}(\phi_d) := \begin{vmatrix} \dfrac{V_{out}}{V_{in}} & \text{if } 0 \leq \phi_d \leq 360 \cdot \deg \cdot \left(\dfrac{1}{3} - \dfrac{1}{6}\right) \\[2ex] \dfrac{V_{out}}{V_{in}} \cdot \left[1 - \dfrac{\phi_d - 360 \cdot \deg \cdot \left(\dfrac{1}{3} - \dfrac{1}{6}\right)}{360 \cdot \deg \cdot \left(\dfrac{1}{2} - \dfrac{1}{3}\right)}\right] & \text{if } 360 \cdot \deg \cdot \left(\dfrac{1}{3} - \dfrac{1}{6}\right) < \\[2ex] & \phi_d \leq 360 \cdot \deg \cdot \left(\dfrac{1}{2} - \dfrac{1}{6}\right) \\[2ex] 0 & \text{otherwise} \end{vmatrix}$$

$$D_{\phi2}(\phi_d) := \begin{vmatrix} \dfrac{V_{out}}{V_{in}} & \text{if } 0 \leq \phi_d \leq 360 \cdot \deg \cdot \left(\dfrac{1}{2} - \dfrac{1}{6}\right) \\[2ex] \dfrac{V_{out}}{V_{in}} \cdot \left[1 - \dfrac{\phi_d - 360 \cdot \deg \cdot \left(\dfrac{1}{2} - \dfrac{1}{6}\right)}{360 \cdot \deg \cdot \left(\dfrac{1}{1} - \dfrac{1}{2}\right)}\right] & \text{if} \\[2ex] 0 & \text{otherwise} \end{vmatrix}$$

$$360 \cdot \deg \cdot \left(\dfrac{1}{2} - \dfrac{1}{6}\right) < \phi_d \leq 360 \cdot \deg \cdot \left(\dfrac{1}{1} - \dfrac{1}{6}\right) \quad en := 0$$

Modified $\phi d$ to account for 2 to 1 phase shedding or 1 to $$\text{2 adding: } \phi_{d1}(\phi_d) := \begin{vmatrix} \phi_d & \text{if } \phi_d \leq 120 \cdot \deg \\ 120 \cdot \deg & \text{otherwise} \end{vmatrix}$$

Ripple Curent Definition $$\Delta i_{L\phi}(D) := \dfrac{V_{in} - V_{out}}{L_\phi} \cdot \dfrac{D}{f_s}$$

General Inductor Current Definition $$I_{L\phi}(t, D) := \begin{vmatrix} -\dfrac{\Delta i_{L\phi}(D)}{2} + \text{mod}\left(t, \dfrac{1}{f_s}\right) \cdot & \text{if } \text{mod}\left(t, \dfrac{1}{f_s}\right) \leq \dfrac{D}{f_s} \\[2ex] \Delta i_{L\phi}(D) \cdot \dfrac{f_s}{D} \\[2ex] \dfrac{\Delta i_{L\phi}(D)}{2} - & \text{otherwise} \\[2ex] \left(\text{mod}\left(t, \dfrac{1}{f_s}\right) - \dfrac{D}{f_s}\right) \cdot \Delta i_{L\phi}(D) \cdot \\[2ex] \dfrac{f_s}{1 - D} \end{vmatrix}$$

Inductor Currents $$I_{L1}(t, \phi_d) := I_{L\phi}(t, D_{\phi2}(0))$$

$$I_{L2}(t, \phi_d) := I_{L\phi}\left(t + \dfrac{5}{N_\phi \cdot f_s} + \dfrac{2 \cdot \pi - \phi_{d1}(\phi_d)}{2 \cdot \pi \cdot f_s} \cdot en, D_{\phi2}(\phi_d)\right)$$

$$I_{L3}(t, \phi_d) := I_{L\phi}\left(t + \dfrac{4}{N_\phi \cdot f_s} + 2 \cdot \dfrac{2 \cdot \pi - \phi_d}{2 \cdot \pi \cdot f_s} \cdot en, D_{\phi3}(\phi_d)\right)$$

$$I_{L4}(t, \phi_d) := I_{L\phi}\left(t + \dfrac{3}{N_\phi \cdot f_s} + 3 \cdot \dfrac{2 \cdot \pi - \phi_d}{2 \cdot \pi \cdot f_s} \cdot en, D_{\phi4}(\phi_d)\right)$$

$$I_{L5}(t, \phi_d) := I_{L\phi}\left(t + \dfrac{2}{N_\phi \cdot f_s} + 4 \cdot \dfrac{2 \cdot \pi - \phi_d}{2 \cdot \pi \cdot f_s} \cdot en, D_{\phi5}(\phi_d)\right)$$

$$I_{L6}(t, \phi_d) := I_{L\phi}\left(t + \dfrac{1}{N_\phi \cdot f_s} + 5 \cdot \dfrac{2 \cdot \pi - \phi_d}{2 \cdot \pi \cdot f_s} \cdot en, D_{\phi6}(\phi_d)\right)$$

Capacitor Ripple Current $$I_C(t, \phi_d) := I_{L1}(t, \phi_d) + I_{L2}(t, \phi_d) + I_{L3}(t, \phi_d) + I_{L4}(t, \phi_d) + I_{L5}(t, \phi_d) + I_{L6}(t, \phi_d)$$

Phase Variable for animation $$\phi_d := \dfrac{\text{FRAME}}{100} \cdot 300 \cdot \deg$$

In summary, the present disclosure implements a "soft start" and/or a "soft stop" approach to turning on and off phases 136, 137, 138, 139, 140, and/or 141 of a multiple-phase electrical converter 130. In addition the system may add or subtract a gradual phase shift during the "soft off" or "soft on" event that reduces the output voltage ripple compared to "abrupt" phase shedding. A benefit of this "soft on" or "soft off" phase shedding is that an output capacitance 150 of the converter 130 may be reduced by a substantial amount (approximately 40%, in an embodiment) compared to typical "abrupt" phase shedding. In an embodiment of a "soft off" phase shed, one phase (e.g., 141) may be shed (turned off) at a time. The phase that is being shed (e.g., 141) may have its duty cycle slowly reduced while a phase offset is introduced to all of the other phases (e.g., 136, 137, 138, 139, and 140). The duty cycle and phase offset continue to grow such that the average current in the inductor 144 of the phase that is being shed (e.g., 141) is allowed to slowly reduce to 0A while the remaining phases (e.g., 136, 137, 138, 139, and 140) have been slowly re-sequenced to a maximum ripple current cancellation mode and the ripple current approaches 0A. The process may continue shedding the remaining phases (e.g., 137, 138, 139, and 140; 136 remains on to keep power to the load 102) in a similar manner until the total number of desired phases has been shed. In an embodiment, the converter 130 may not perform a phase offset when shedding from 2 phases to 1 phase. In an embodiment, a "soft on" sequence operates substantially the same only in reverse.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-phase electrical converter comprising:
an electrical input;
an electrical output;
a converter having a plurality of converter phases coupled with the electrical input and the electrical output, each of the converter phases including a high side switch; and
a controller to ramp operation of one or more of the converter phases as a load demand increases, wherein a converter phase being turned on has a duty cycle of its high side switch increased over a time period simultaneously with a phase offset being introduced over the time period to the remaining converter phases, and wherein the time period over which the duty cycle is increased and the phase offset is introduced is selected such that an average current associated with the converter phase being turned on is increased over the time period while the remaining converter phases shift over the time period such that an output ripple voltage at the electrical output is reduced relative to a ripple voltage that would be produced in response to an abrupt turn-on of the converter phase.

2. The converter of claim 1, wherein the converter is a multi-phase buck converter operable to perform a soft start over the time period, wherein the soft start comprises increasing the duty cycle of the converter phase high side switch over the time period simultaneously with the phase offset being introduced over the time period to the remaining converter phases.

3. The converter of claim 1, wherein the converter phases further comprise:
a low side switch and an inductor.

4. The converter of claim 1, wherein a minimum of two converter phases are operating.

5. The converter of claim 1, further comprising:
a capacitor coupled with the electrical output to reduce the output ripple voltage at the electrical output.

6. An information handling system (IHS) comprising:
a processor; and
a multi-phase electrical converter comprising:
an electrical input;
an electrical output;
a converter having a plurality of converter phases coupled with the electrical input and the electrical output, each of the converter phases including a high side switch; and
a controller to ramp operation of one or more of the converter phases as a load demand of the processor increases, wherein a converter phase being turned on has a duty cycle of its high side switch increased over a time period simultaneously with a phase offset being introduced over the time period to the remaining converter phases, and wherein the time period over which the duty cycle is increased and the phase offset is introduced is selected such that an average current associated with the converter phase being turned on is increased over the time period while the remaining converter phases shift over the time period such that an output ripple voltage at the electrical output is reduced relative to a ripple voltage that would be produced in response to an abrupt turn-on of the converter phase.

7. The IHS of claim 6, wherein the converter is a multi-phase buck converter operable to perform a soft start over the time period, wherein the soft start comprises increasing the duty cycle of the converter phase high side switch over the time period simultaneously with the phase offset being introduced over the time period to the remaining converter phases.

8. The IHS of claim 6, wherein the converter phases further comprise:
a low side switch and an inductor.

9. The IHS of claim 6, wherein a minimum of two converter phases are operating.

10. The IHS of claim 6, further comprising:
a capacitor coupled with the electrical output to reduce the output ripple voltage at the electrical output.

11. A method of controlling a multi-phase electrical converter comprising:
providing a converter having a plurality of converter phases that is coupled to an electrical input and an electrical output, wherein each of the converter phases includes a high side switch; and
ramping operation of one or more of the converter phases as a load demand increases, wherein a converter phase being turned on has a duty cycle of its high side switch increased over a time period simultaneously with a phase offset being introduced over the time period to the remaining converter phases, and wherein time period over which the duty cycle is increased and the phase offset is introduced is selected such that an average current associated with the converter phase being turned on is increased over the time period while the remaining converter phases shift over the time period such that an output ripple voltage at the electrical output is reduced relative to a ripple voltage that would be produced in response to an abrupt turn-on of the converter phase.

12. The method of claim 11, wherein the converter provided is a multi-phase buck converter operable to perform a soft start over the time period, wherein the soft start comprises increasing the duty cycle of the converter phase high side switch over the time period simultaneously with the phase offset being introduced over the time period to the remaining converter phases.

13. The method of claim 12, wherein each of the converter phases includes a low side switch for the converter phases.

14. The method of claim 13, wherein a minimum of two converter phases are operating.

* * * * *